United States Patent
Harnoncourt

[15] 3,638,109
[45] Jan. 25, 1972

[54] DEVICE FOR THE DETERMINATION OF THE PH VALUE OF A BLOOD TEST SAMPLE

[72] Inventor: Karl Harnoncourt, Graz, Austria

[73] Assignee: Hans List, Graz, Austria

[22] Filed: Apr. 22, 1969

[21] Appl. No.: 818,287

[30] Foreign Application Priority Data

Apr. 30, 1968  Austria ..............................A 4208/68

[52] U.S. Cl. ..............................324/30 R, 23/253, 23/230 B, 204/1 T
[51] Int. Cl. ......................................................G01n 27/42
[58] Field of Search................324/30; 204/1 T, 195; 23/230, 23/253

[56] References Cited

UNITED STATES PATENTS

| | | | |
|---|---|---|---|
| 3,147,081 | 9/1964 | Stevenson | 324/30 X |
| 3,151,052 | 9/1964 | Arthur | 204/195 |

*Primary Examiner*—Michael J. Lynch
*Attorney*—Watson, Cole, Grindle & Watson

[57] ABSTRACT

A measuring instrument for the determination of the pH value of a blood test sample including a three-way valve wherein its switch body comprises an electrolyte chamber into which the measurement-sensitive extremity of a reference electrode protrudes, the chamber having an inlet and an outlet in which the outlet is closed in a first end position of the switch body, each inlet and outlet communicating with a corresponding inlet and outlet port for the electrolyte in an intermediate position whereas, in a second end position of the switch body the inlet is closed and the outlet communicates with an aperture provided on the side of a measuring capillary.

2 Claims, 7 Drawing Figures

PATENTED JAN 25 1972
3,638,109
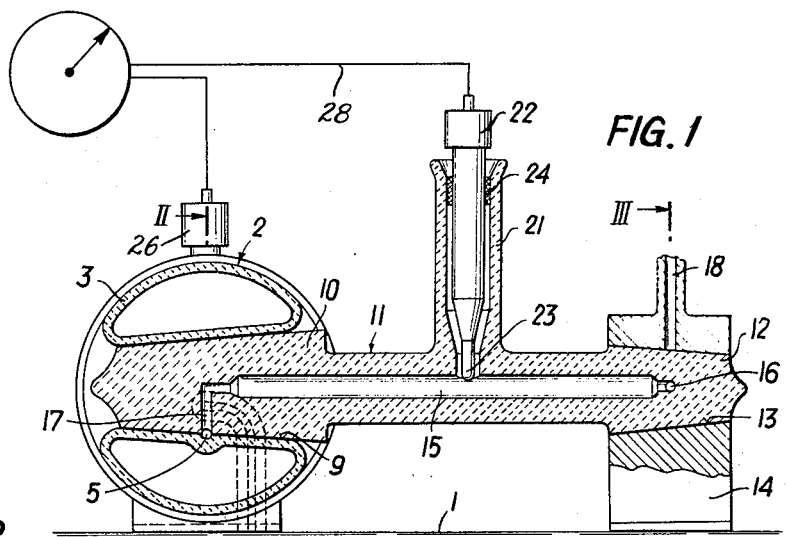
FIG. 1
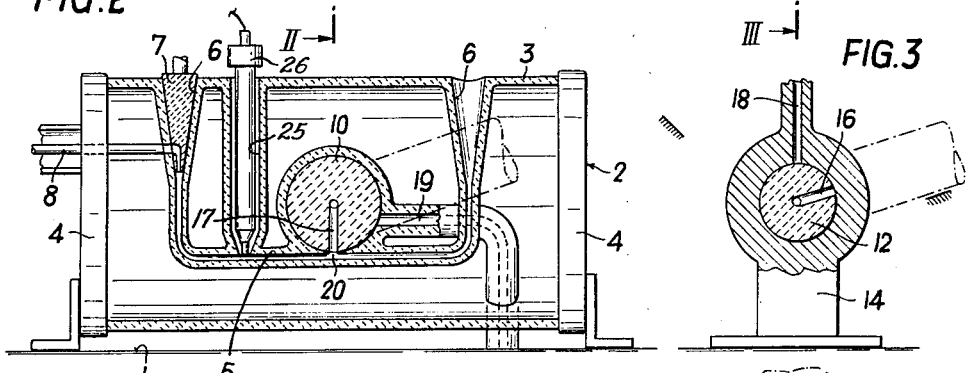
FIG. 2
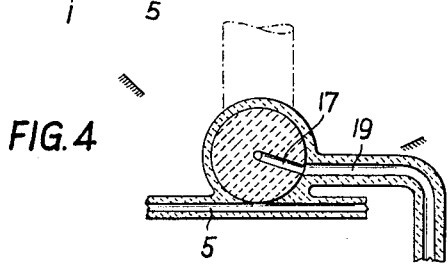
FIG. 4
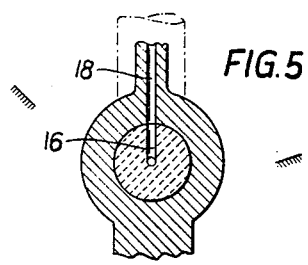
FIG. 3 / FIG. 5
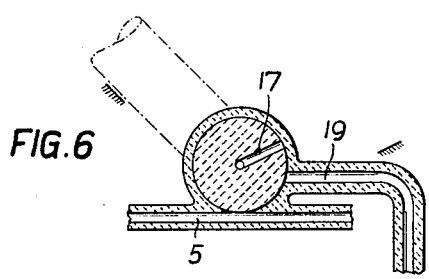
FIG. 6
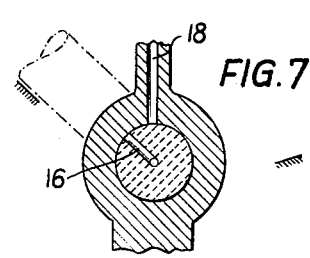
FIG. 7
Inventor
Karl Harnoncourt
By Watson, Cole, Grindle & Watson
Attys.

DEVICE FOR THE DETERMINATION OF THE PH VALUE OF A BLOOD TEST SAMPLE

The invention relates to a device for the determination of the pH value of a blood test sample located in a measuring capillary tube inside a thermostatized container by means of an electrode in direct contact with the blood test sample and a reference electrode connected with the blood test sample by means of an electrolytic bridge and an electric measuring an recording unit connected to the electrode arrangement.

The determination of the pH value of a blood test sample is part and parcel of a method of clinical examination called "blood gas analysis" and comprising also the determination of the partial oxygen pressure, the partial carbon dioxide pressure and the bicarbonate content of the blood.

For routine examinations micromethods have already been devised which permit the determination of the above-mentioned values in very small quantities of blood. As a rule, only about two drops of blood taken from the digital pulp of the patient suffice for these examinations.

The results of these examinations are of the greatest importance for the diagnosis of diseases of the heart, the lungs and of metabolism. However, the general adoption of the blood-microanalysis has been handicapped by the shortcomings of conventional measuring systems which are extremely complicated both with regard to their design and operation. The difficulty of handling conventional equipment and its particular susceptibility to trouble require the employment of highly trained operators in order to preclude erroneous measurements which may have grave consequences. Another disadvantage of conventional equipment resides in the relatively long time required for each individual measurement.

An accurate blood gas analysis calls for the triple determination of the pH value at different carbon dioxide concentrations of the same blood test sample. The first measurement is practiced on the unaltered blood test sample and thus furnishes the pH value of the blood test sample with its natural carbon dioxide content. For the two remaining measurements the blood test sample has to be balanced in each case by means of a standard gas having an accurately defined carbon dioxide content. Results are recorded by means of a nomogram with readings showing showing the partial carbon dioxide pressure, the bicarbonate content and where necessary, further characteristic values of the blood test sample.

The chief drawback of conventional measuring instruments for the determination of the pH value resides in the difficulty of producing an open electrolytic connection between the blood test sample and the reference electrode. As a matter of fact, any air bubbles produced at the point of contact between the blood test sample and the electrolytic liquid as well as any mixture between the two liquids are bound to cause inadmissible measuring faults. Elimination of these sources of error is extremely difficult with conventional measuring systems because it can be achieved by optical means only, that is by a permanent observation of the critical contact area between the blood test sample and the electrolyte.

One of the conventional measuring systems provides for a removable thermostatized measuring head containing the blood capillary and connected by means of appropriate hoses with the water supply system of the instrument. In order to produce the required electrolytic bridge between the blood test sample and the reference electrode it is necessary to dip the extremity of the blood capillary protruding from the measuring head in the electrolytic solution of a reference capillary.

According to another conventional system one end of the measuring capillary tube located in the thermostatized measuring head for the determination of the pH value presents an enlargement which is open in an upward direction and into which the measurement-sensitive extremity of the reference electrode has to be introduced for the obtention of an electrolytic connection.

The two conventional devices referred to above require therefore, a complicated operation for the obtention of an electrolytic connection and permanent visual control if sources of error, such as the presence of air bubbles at the point of contact, are to be avoided.

Therefore, the object of the present invention is a measuring device for the determination of the pH value where manual operations are reduced to the minimum and the sources of error inherent in conventional apparatuses are eliminated to a considerable extent. In particular, the measuring instrument according to the invention is supposed to allow even unskilled operators to work at great speed. Consequently, according to the invention, the measuring apparatus of the type hereabove described comprises a three-way valve whose switch body comprises an electrolyte chamber into which the measurement-sensitive extremity of the reference electrode protrudes and having an inlet and an outlet, the latter apertures being closed in a first end position of the switch body, each of them communicating with a corresponding inlet and outlet port for the electrolyte in an intermediate position, whereas in the second end position of the switch body the inlet of the electrolyte chamber is closed and the outlet communicates with an aperture provided on the side of the measuring capillary.

The main advantage of this arrangement resides in a considerable simplification of the measures to be taken for the provision of an electrolytic connection between the blood test sample and the reference electrode and in the dependability of the electrolytic bridge automatically obtained when the three-way valve is actuated, as a result of which visual control of the critical junction may be dispensed with. Another advantage of the arrangement according to the invention stems from the fact that, contrary to conventional devices, the reference electrode represents a component part of the measuring instrument which although removable if and when necessary, is rigidly connected with the instrument so that complicated operations for the maintenance of the reference electrode are not required.

Instrumental in the achievement of an absolutely safe electrolytic bridge even after a long standstill is the fact that whenever the switch body of the three-way valve is switched from its first end position (position of rest), where the electrolytic chamber is shut off the outside, to the second end position (measuring position), where the electrolytic connection is to be produced, the above-mentioned intermediate position is passed through, during which the used electrolyte left in the electrolytic chamber from the preceding measurement is discharged and replaced by a fresh electrolyte in a quantity which is sufficient to completely fill the existing cavities. By this renewal of electrolyte the formation of air bubbles in the area of the lateral outlet of the measuring capillary is safely avoided and positive contact between the blood test sample and the electrolyte in this particular place ensured.

It goes without saying that this arrangement is conducive to results of the measurements which are extremely accurate and free from individual influences.

The consecutive determination of the three pH values which are of decisive importance for the nomographic evaluation of the measurement when the blood test sample is examined with different carbon dioxide concentrations is performed in one and the same measuring head as usual. The time required for the triple measurement inclusive of the necessary intermediate operation (enrichment of the carbon dioxide content of the blood test sample by means of calibration gases of different carbon dioxide contents prior to the second and third measurement) is reduced to a fraction of the duration of measurements carried out with conventional devices owing to the simplicity of operations and the immediate readiness of the instrument following each switchover.

According to a preferred embodiment of the invention the switch body of the three-way valve is designed as a glass bulb which is ground with its tapered end portion, on the surface of which the outlet of the electrolyte chamber is provided, into a conical receiving bore extending transversely through the container where the lateral aperture of the measuring capillary tube and the electrolyte outlet port terminate, whereas the opposite tapered end portion of the glass bulb, on the surface of which the inlet of the electrolyte chamber is provided, is ground in a conical-bearing bore wherein the electrolyte inlet port terminates.

This design distinguishes itself not only by its structural simplicity but also by the neat grouping of the component parts permitting convenient and rapid inspection of the whole instrument. Moreover, the design is largely in accordance with the customary design principles for medical equipment and also in line with the requirements of low-cost serial production.

Further details of the invention will appear from the following description of an embodiment of the invention with reference to the accompanying schematic drawings in which:

FIG. 1 shows a cross section of a measuring instrument according to the invention, FIG. 2 is a cross-sectional view of the same instrument taken on line II—II of FIG. 1, FIG. 3 is another cross-sectional view taken on line III—III of FIG. 1.

FIGS. 4 and 5, as well as FIGS. 6 and 7 show partial cross-sectional view corresponding to the illustrations in FIGS. 2 and 3, respectively, of the instrument according to the invention in different operational positions.

On the measuring table 1 the measuring head 2 of the instrument is secured, comprising a hollow-cylindrical glass vessel 3 tightly sealed at both ends by means of caps 4. The vessel 3 contains a measuring capillary tube 5 destined to receive the blood test sample to be examined. The two bent-up extremities of the measuring capillary tube 5 terminate each with a funnel-shaped flaring 6 on top of the glass vessel 3.

The interior of the glass vessel 3 is filled with a liquid, for example, water, whose temperature is maintained at the level of the body temperature (approximately 37° C.) by thermostat control. For greater clarity, the thermostat control with the connections of the vessel 3 has been omitted from the drawing. Via a switchover cock 7 and connecting pipes 8 calibration gases of different carbon dioxide concentrations can be introduced in the capillary tube 5 as required.

The glass vessel 3 has a tapered transverse bearing bore 9 into which the tapered end 10 of a glass bulb 11 is ground. The other conical extremity 12 of the glass bulb 11 is ground into a corresponding bearing bore 12 of a bearing body 14 mounted on the measuring table 1.

The glass bulb 11 comprises a longitudinal chamber 15 having a radial inlet 16 in the area of the conical extremity 12 and a radial outlet 17 at the opposite extremity. In the bearing bore 13 of the bearing body 14 terminates an inlet port 18 through which the chamber 15 can be filled with a liquid electrolyte in a position where the inlet port 18 registers with the inlet 16 of the glass bulb 11 (see FIG. 5). A lateral outlet port 19 extending from the conical receiving bore 9 of the glass vessel 3 registers with the outlet 17 of the electrolyte chamber 15 when the glass bulb 11 occupies the position illustrated in FIG. 5. The electrolyte chamber 15 can be drained through this outlet port 19.

The measuring capillary tube 5 has a lateral aperture 20 which in the position of the bulb 11 illustrated in FIGS. 1 to 3 registers with the outlet 17 of the electrolyte chamber 15. The vessel 3 has a receiving bore 25 in which the pH-sensitive measuring electrode 26 is tightly inserted. Bore 25 terminates in the measuring capillary tube 5 and measuring electrode 26 is connected to an electric measuring and recording device 29 via a connection 27.

The glass bulb 11 is provided with a hollow lateral nozzle 21 defining a receiving bore wherein the reference electrode 22 is located whose measurement-sensitive end 23 protrudes into the electrolyte chamber 15. The reference electrode 22 is sealed off against the hollow nozzle 21 by means of a packing 24. The reference electrode 22 is connected to the electric measuring and recording device 29 via a connection 28.

The procedure for determining the pH value of a blood test sample by means of the instrument according to the invention is as follows:

If the measurement is to be performed following a standstill of some length, the measuring capillary tube 5 should first be cleaned and then dried, whereupon the reference electrode 22 is preferably calibrated by the introduction of a calibrating solution into the measuring capillary tube 5. After the measuring capillary tube 5 has again been cleaned and dried in a manner known per se, the glass bulb 11, which serves as a switch body for the three-way valve, occupies an end position (position of rest) as shown in FIGS. 6 and 7, the inlet and outlet 16 and 17 respectively of the electrolyte chamber 15 being closed. The blood test sample taken from the digital pulp of the patient and preserved in a tube and mixed with an anticoagulation agent is now introduced into the measuring capillary tube 5 through the free funnel-shaped flaring 6, whereupon the reference electrode 22 is switched on and the glass bulb 11 is rotated about its longitudinal axis in an anticlockwise direction, when it passes the intermediate position shown in FIGS. 4 and 5 where the ports 16 and 18 register with 17 and 19, respectively. At the same time, any electrolyte left in the chamber 15 from the preceding measurement is discharged through the outlet 19 and fresh electrolyte flows into the chamber 15 through the inlet port 18, completely filling the cavities of the bulb 11. After this intermediate position has been passed, the glass bulb 11 occupies the second end position shown in FIGS. 1 to 3, and corresponding to the measuring position. In this position the outlet 17 of the chamber 15 registers with the lateral aperture 20 of the measuring capillary tube 5. Thus the electrolyte establishes contact at the lateral aperture 20 of the measuring capillary tube 5 with the blood test sample contained therein. Thus the required electrolytic connection between the blood test sample and the reference electrode 22 is established.

As soon as the glass bulb 11 has returned to its initial end position as shown in FIGS. 6 and 7 and upon completion of the intermediate operations as required, the measuring procedure can be repeated in the manner hereabove described.

The invention is not, however, restricted to the embodiment of the invention as hereabove described and as illustrated in the drawings, but a different structural arrangement combining the device for measuring the pH value with other measuring systems required for the microanalysis of gases is also possible within the scope of the present invention.

I claim:

1. A measuring instrument for the determination of the pH value of a blood test sample, comprising a combination, a thermostated container, a measuring capillary tube containing said blood test sample and being located in said container and sealed off from the interior thereof, a first receiving bore in said container extending in transverse relation to and terminating in said measuring capillary tube, an electrical measuring and recording device, a pH-sensitive measuring electrode inserted in said receiving bore of said container in contact with the said blood test sample and electrically connected to said electrical measuring and recording device, a three-way valve comprising two stationary bearing bodies and a switch member orientably located in said bearing bodies, a first bearing bore extending through said container in transverse relation thereto and sealed off from the interior of said container, said first bearing bore being defined by one of said bearing bodies of said three-way valve, a lateral aperture originating in said measuring capillary tube and terminating in said first bearing bore, a second bearing body defining said second bearing bore in axial alignment with said first bearing bore, an electrolyte chamber located in said switch member and containing a liquid electrolyte, an inlet port in said switch member connected with one end of the said electrolyte chamber, an outlet port in said switch member connected with the other end of said electrolyte chamber, a second receiving bore in said switch member extending in transverse relation to said electrolyte chamber and terminating therein, a reference electrode inserted in said second receiving bore in contact with said liquid electrolyte and electrically connected to said measuring and recording device, an inlet pipe for said electrolyte having an inlet duct terminating in said second bearing bore of said second bearing body and cooperating with said inlet port of said switch member, an outlet pipe for said electrolyte having outlet duct terminating in said first bearing bore of said one bearing body, said outlet port of said switch member cooperating both with said outlet duct and with said lateral aperture of said measuring capillary tube, said switch body being manually orientable from a final measuring position via an intermediate position into a final measuring position, said inlet and outlet ports of said switch body being closed in said final rest position of said switch member, said inlet port being connected with said inlet duct for the electrolyte and said outlet port being connected with said duct for the electrolyte in said intermediate position of said switch member, and said inlet port being closed and said outlet port being connected with said lateral aperture of said measuring capillary tube in said final measuring position of said switch member of said three-way valve.

2. A measuring instrument according to claim 1, wherein each of said first and second bearing bores are conical in shape, said lateral aperture of said measuring capillary tube and said electrolyte outlet duct terminating in said first conical bearing bore, said electrolyte inlet duct terminating in said second conical-bearing bore, said switch member of said three-way valve being a glass flask having a first tapered end portion ground into the said first conical-bearing bore, said outlet port of said switch member terminating on the outer surface of said first end portion of said switch member, said switch member having a second tapered end portion which is ground into said second conical bearing bore, and said intake port of said switch member terminating on the outer surface of the said second conical end portion of said switch member.

* * * * *